United States Patent
Miwa et al.

(10) Patent No.: US 10,193,969 B2
(45) Date of Patent: Jan. 29, 2019

(54) PARALLEL PROCESSING SYSTEM, METHOD, AND STORAGE MEDIUM

(71) Applicant: FUJITSU LIMITED, Kawasaki-shi, Kanagawa (JP)

(72) Inventors: Masahiro Miwa, Kawaguchi (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 15/137,221

(22) Filed: Apr. 25, 2016

(65) Prior Publication Data

US 2016/0352824 A1    Dec. 1, 2016

(30) Foreign Application Priority Data

Jun. 1, 2015  (JP) .................................. 2015-111287

(51) Int. Cl.
*H04L 29/08*   (2006.01)

(52) U.S. Cl.
CPC .......... *H04L 67/1044* (2013.01); *H04L 67/10* (2013.01)

(58) Field of Classification Search
CPC ............................. H04L 67/1044; H04L 67/10
See application file for complete search history.

(56) References Cited

U.S. PATENT DOCUMENTS

| | | | | |
|---|---|---|---|---|
| 5,265,207 A | * | 11/1993 | Zak ......................... | G06F 11/08 370/408 |
| 8,370,496 B1 | * | 2/2013 | Marr .................... | H04L 67/1031 370/396 |

(Continued)

FOREIGN PATENT DOCUMENTS

| | | |
|---|---|---|
| JP | 2008-516346 | 5/2008 |
| JP | 2010-257056 | 11/2010 |
| JP | 2011-175573 | 9/2011 |

OTHER PUBLICATIONS

2011 IEEE International Parallel & Distributed Processing Symposium Fat-Trees Routing and Node Ordering Providing Contention Free Traffic for MPI Global Collectives Eitan Zahavi, Mellanox Technologies LTD (Year: 2011).*

*Primary Examiner* — Michael A Keller
*Assistant Examiner* — Javier O Guzman
(74) *Attorney, Agent, or Firm* — Staas & Halsey LLP

(57) ABSTRACT

A system is a multi-layered fullmesh system in which layers of fullmesh systems, having Leaf switches fullmesh-coupled to each other, are coupled to each other, the system including nodes and performing applications, at least one of nodes being coupled to each of the Leaf switches. The parallel processing system includes circuitry configured to: compare communication recording information in which a number of times of communication between nodes during execution of an application is recorded with communication pattern information in which assignment information indicating which nodes having an intra-layer or inter-layer connection relationship with a Leaf switch are assigned is specified for each communication pattern; extract assignment information of a communication pattern which is the most similar to communication indicated by the communication recording information, based on the communication pattern information; and assign nodes that subsequently execute the application, based on the extracted assignment information.

6 Claims, 20 Drawing Sheets

(56) References Cited

U.S. PATENT DOCUMENTS

| | | | | |
|---|---|---|---|---|
| 8,705,368 | B1* | 4/2014 | Abts | H04L 47/10 |
| | | | | 370/238 |
| 9,264,312 | B2* | 2/2016 | Shah | H04L 41/12 |
| 2001/0006522 | A1* | 7/2001 | Beshai | H04L 47/24 |
| | | | | 370/380 |
| 2005/0080894 | A1* | 4/2005 | Apostolopoulos | ............ |
| | | | | H04L 41/0816 |
| | | | | 709/224 |
| 2005/0195808 | A1* | 9/2005 | Chen | H04L 49/1576 |
| | | | | 370/386 |
| 2006/0101104 | A1 | 5/2006 | Bhanot et al. | |
| 2011/0080851 | A1* | 4/2011 | Wan | H04L 45/02 |
| | | | | 370/255 |
| 2012/0140621 | A1* | 6/2012 | Wu | H04L 69/163 |
| | | | | 370/230 |
| 2012/0151090 | A1* | 6/2012 | Nakashima | H04L 49/358 |
| | | | | 709/238 |
| 2013/0114620 | A1* | 5/2013 | Bogdanski | H04L 45/48 |
| | | | | 370/408 |
| 2014/0241443 | A1* | 8/2014 | Nowick | H04L 25/03 |
| | | | | 375/259 |
| 2016/0112306 | A1* | 4/2016 | Song | H04L 12/6418 |
| | | | | 398/45 |

\* cited by examiner

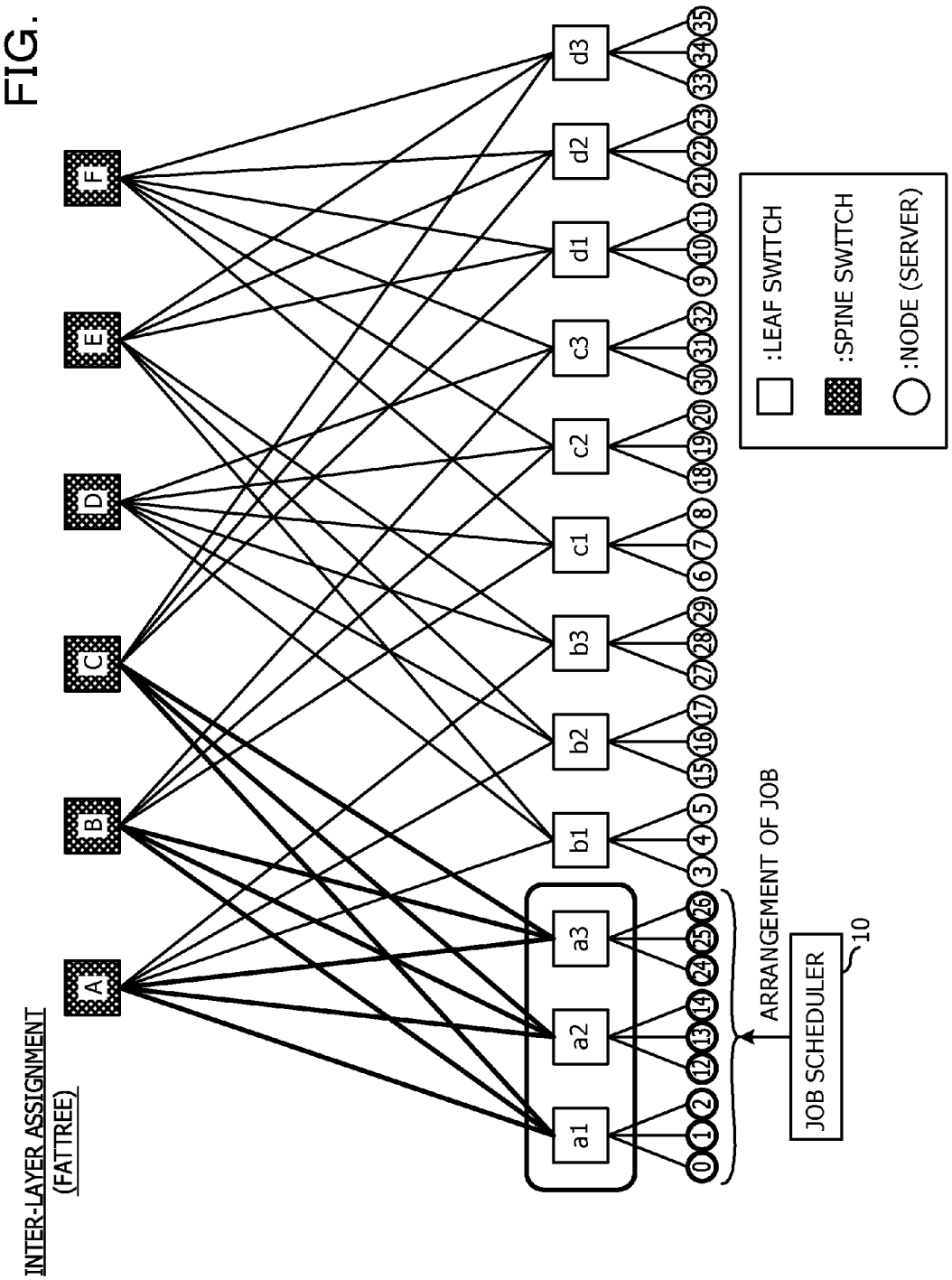

FIG. 4

| COMMUNICATION PATTERN | EXAMPLE OF EXPRESSION INDICATING COMMUNICATION PATTERN | |
|---|---|---|
| BITCOMP (BIT COMPLEMENT) | $d_i = \neg s_i$ | EXPRESSION 1 |
| BITREV (BIT REVERSE) | $d_i = s_{b-i-1}$ | EXPRESSION 2 |
| NEIGHBOR | $d_x = s_x + 1 \bmod k$ | EXPRESSION 3 |
| SHUFFLE | $d_i = s_{i-1 \bmod b}$ | EXPRESSION 4 |
| TORNADO | $d_x = s_x + \left(\lceil k/2 \rceil - 1\right) \bmod k$ | EXPRESSION 5 |
| TRANSPOSE | $d_i = s_{i + b/2 \bmod b}$ | EXPRESSION 6 |
| UNIFORM | SOURCES TRANSMIT THE SAME AMOUNT OF TRAFFIC TO RESPECTIVE TRANSMISSION DESTINATIONS | |

$s_i$ ··· I BIT OF SOURCE ADDRESS
$d_i$ ··· I BIT OF DESTINATION ADDRESS
$s_x$ ··· SOURCE NODE X
$d_x$ ··· DESTINATION NODE X
$b$ ··· ADDRESS LENGTH (THE NUMBER OF BITS)
$k$ ··· THE NUMBER OF ADDRESSES

FIG. 6
FULLMESH 64 NODES
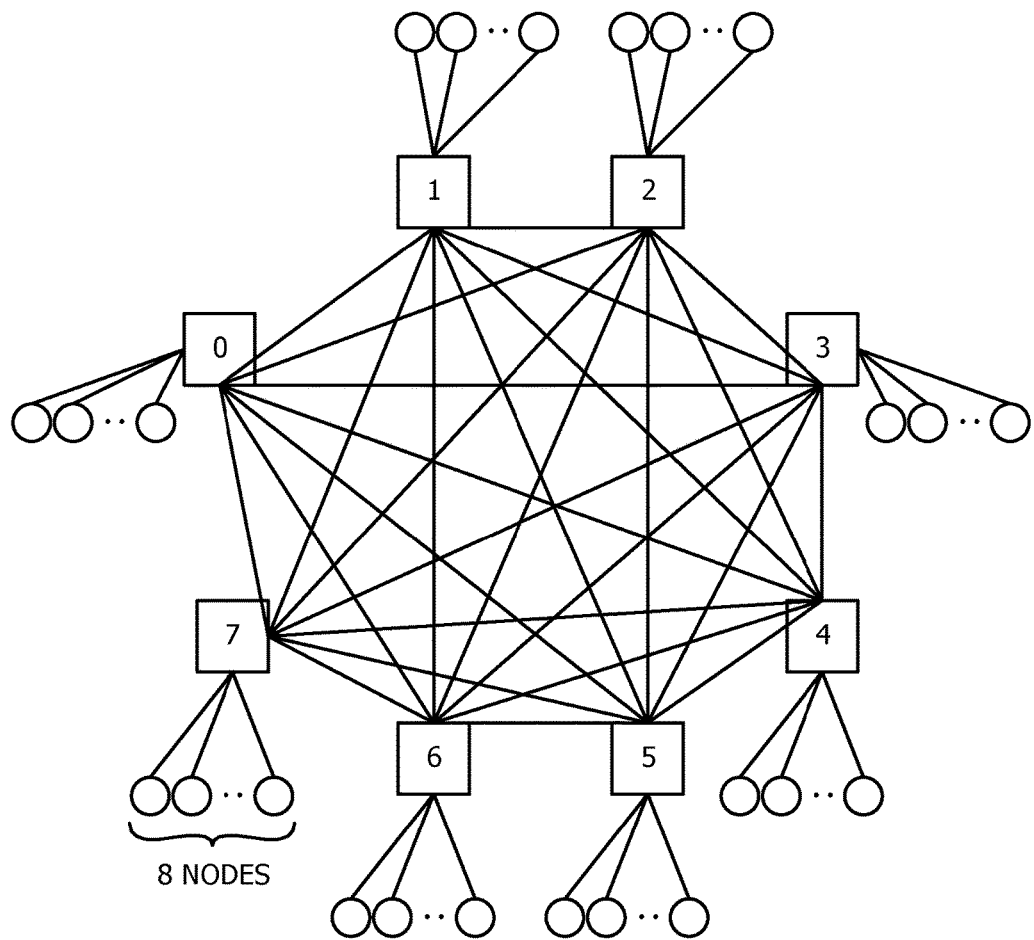
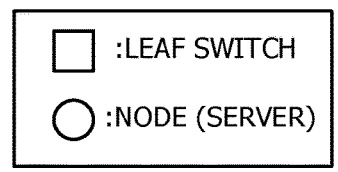

FIG. 9

|         | BITCOMP | BITREV | NEIGHBOR | SHUFFLE | TORNADO | TRANSPOSE | UNIFORM |
|---------|---------|--------|----------|---------|---------|-----------|---------|
| FATREE  | ○       |        | ○        | ○       | ○       |           | ○       |
| FULLMESH|         | ○      |          |         |         | ○         |         |

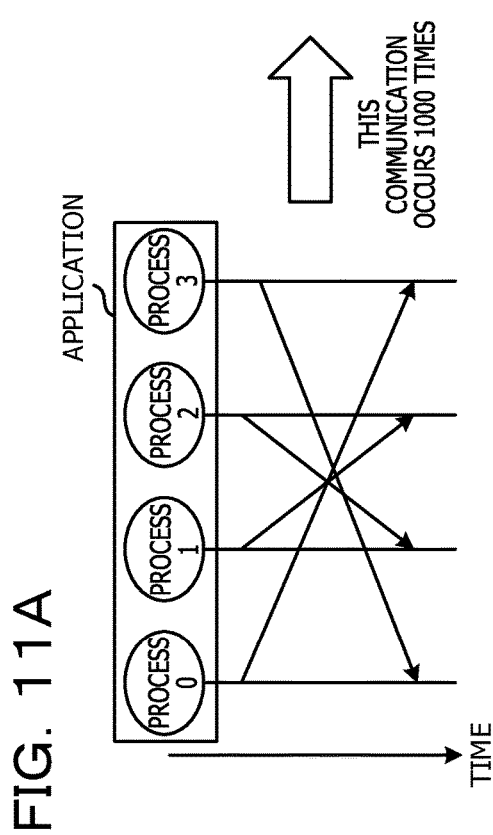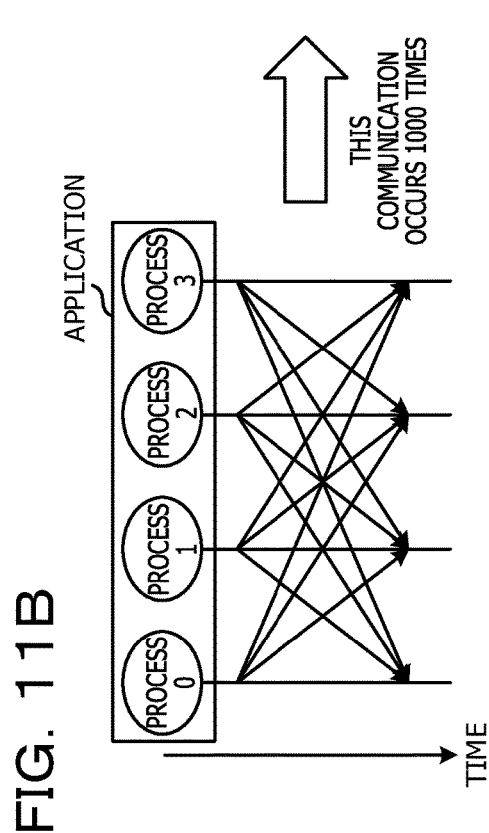
FIG. 11A
FIG. 11B

FIG. 13

TRANSMISSION SOURCE / TRANSMISSION DESTINATION

|   | 0 | 1 | 2 | 3 |
|---|---|---|---|---|
| 0 | 0 | 0 | 0 | 1000 |
| 1 | 0 | 0 | 1000 | 0 |
| 2 | 0 | 1000 | 0 | 0 |
| 3 | 1000 | 0 | 0 | 0 |

← MATRIX A (BITCOMP)

TRANSMISSION SOURCE / TRANSMISSION DESTINATION

|   | 0 | 1 | 2 | 3 |
|---|---|---|---|---|
| 0 | 0 | 1000 | 1000 | 1000 |
| 1 | 1000 | 0 | 1000 | 1000 |
| 2 | 1000 | 1000 | 0 | 1000 |
| 3 | 1000 | 1000 | 1000 | 0 |

← MATRIX B (UNIRORM)

COMPARISON

EXAMPLE OF COMMUNICATION PATTERN $$\begin{bmatrix} 0 & 0 & 0 & 1 \\ 0 & 0 & 1 & 0 \\ 0 & 1 & 0 & 0 \\ 1 & 0 & 0 & 0 \end{bmatrix}$$
BITCOMP $$\begin{bmatrix} 0 & 1 & 0 & 0 \\ 0 & 0 & 1 & 0 \\ 0 & 0 & 0 & 1 \\ 1 & 0 & 0 & 0 \end{bmatrix}$$
NEIGHBOR

| USER NAME | APPLICATION NAME | COMMUNICATION PATTERN |
|---|---|---|
| USER001 | A | UNIFORM |
| USER001 | B | BITREV |
| USER002 | C | TRANSPOSE |
| ... | ... | ... |

FIG. 15

| NODE GROUP ID (24a) | FULLMESH NUMBER (24b) | FATTREE NUMBER (24c) | ASSIGNED INFORMATION (24d) |
|---|---|---|---|
| NODE 000 | M1 | T1 | YES |
| NODE 001 | M1 | T2 | NO |
| NODE 002 | M1 | T3 | NO |
| ... | ... | ... | ... |
| NODE 062 | M2 | T1 | NO |
| NODE 063 | M2 | T2 | NO |
| ... | ... | ... | ... |

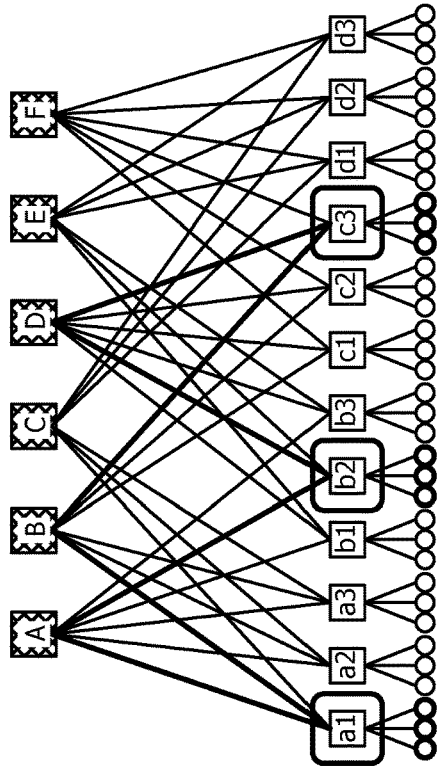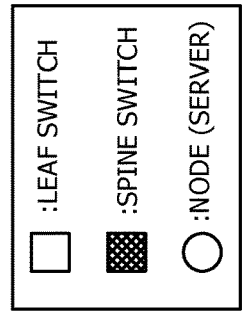
FIG. 19A
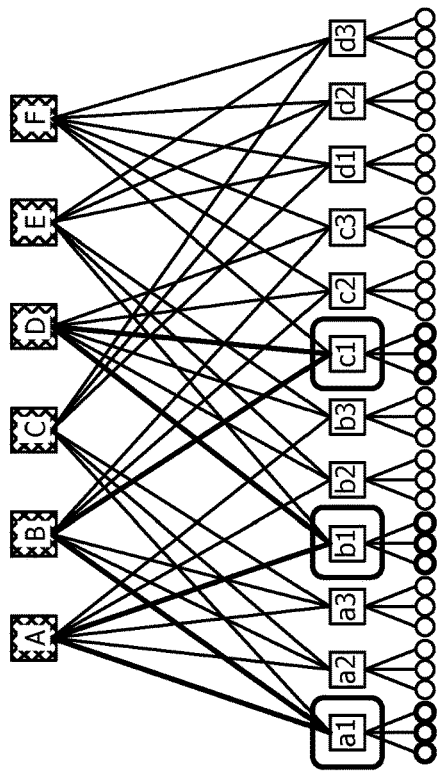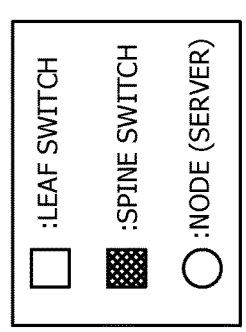
FIG. 19B

PARALLEL PROCESSING SYSTEM, METHOD, AND STORAGE MEDIUM

CROSS-REFERENCE TO RELATED APPLICATION

This application is based upon and claims the benefit of priority of the prior Japanese Patent Application No. 2015-111287, filed on Jun. 1, 2015, the entire contents of which are incorporated herein by reference.

FIELD

The embodiment discussed herein is related to a parallel processing system, a method, and a storage medium.

BACKGROUND

There has been known a technique related to a job scheduling method in a parallel computer system including a plurality of computers such as a PC cluster. The technique relates to a cluster system including a batch server that assigns batch processing requested from a front end to a plurality of calculation nodes.

In a parallel computer system in which a plurality of nodes (servers) perform calculation in parallel, collective communication is performed. The collective communication refers to communication in which communication data is transmitted and received between node groups coupled to each other through a network.

As examples of the related art, Japanese Laid-open Patent Publication Nos. 2011-175573 and 2010-257056, and Japanese National Publication of International Patent Application No. 2008-516346 are known.

SUMMARY

According to an aspect of the invention, a parallel processing system which is a multi-layered fullmesh system in which a plurality of layers of fullmesh systems, having a plurality of Leaf switches fullmesh-coupled to each other, are coupled to each other, the parallel processing system including a plurality of nodes, the parallel processing system being configured to perform a parallel arithmetic operation of applications, at least one of the plurality of nodes being coupled to each of the plurality of Leaf switches, the parallel processing system comprising: circuitry configured to: compare communication recording information in which a number of times of communication between nodes during execution of an application is recorded with communication pattern information in which assignment information indicating which nodes having an intra-layer or inter-layer connection relationship with a Leaf switch are assigned is specified for each communication pattern; extract assignment information of a communication pattern which is the most similar to communication indicated by the communication recording information, based on the communication pattern information; and assign nodes that subsequently execute the application, based on the extracted assignment information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates inter-layer assignment (case of fattree) of nodes according to an embodiment;

FIG. 4 illustrates examples of communication patterns which are used for evaluation according to an embodiment;

FIG. 6 illustrates an example of fullmesh topology according to an embodiment;

FIG. 9 illustrates an example of evaluation results according to an embodiment;

FIGS. 11A and 11B illustrate examples of a communication recording information table according to an embodiment;

FIG. 13 is a diagram illustrating the calculation of a distance according to an embodiment;

FIG. 14 illustrates an example of a job management table according to an embodiment;

FIG. 15 illustrates an example of a resource assignment table according to an embodiment;

FIGS. 19A and 19B illustrate another example of fullmesh topology according to an embodiment.

DESCRIPTION OF EMBODIMENT

Figure 1:
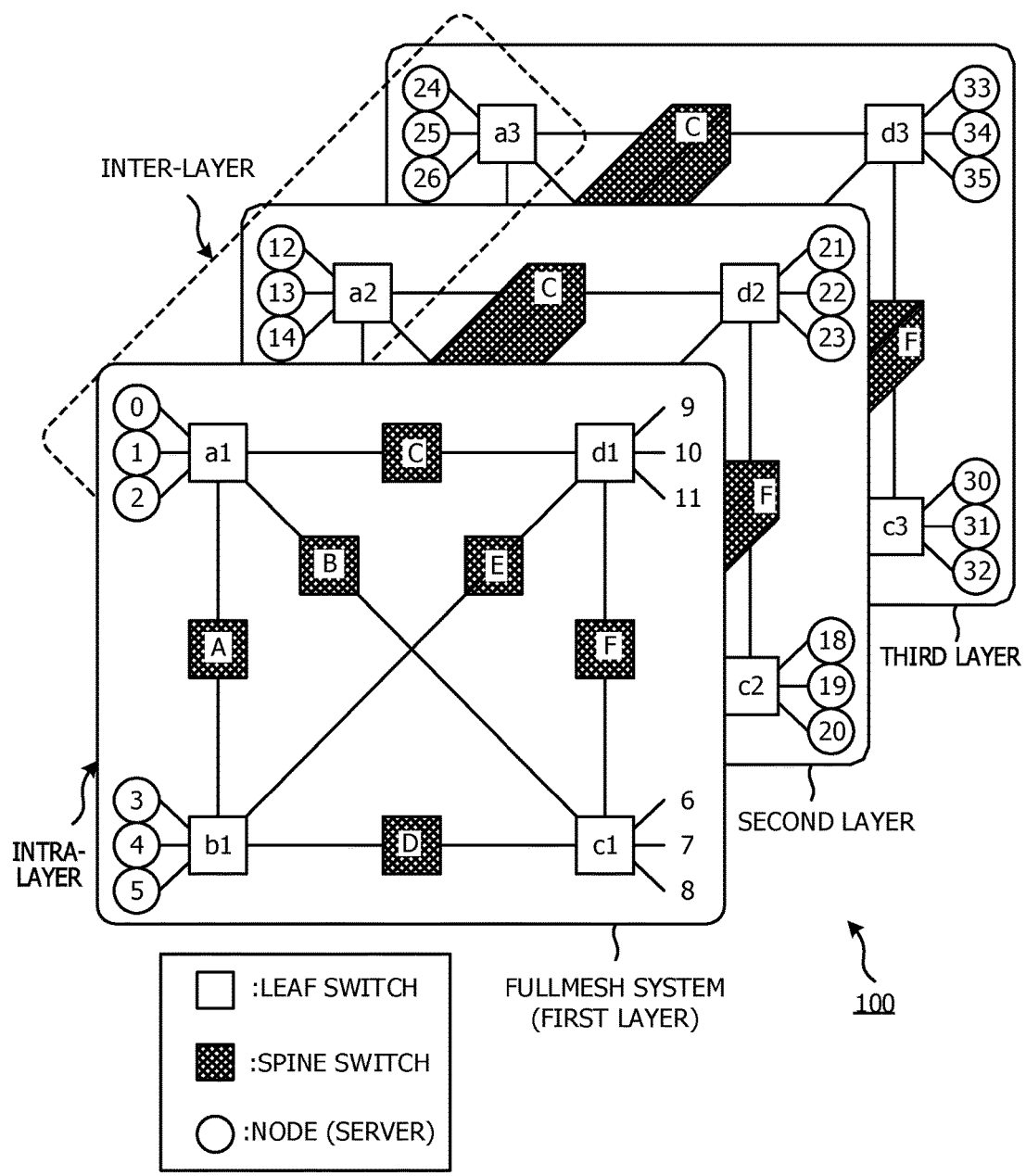
FIG. 1 is a diagram illustrating an example of a multi-layered fullmesh system according to an embodiment.

The performance of a parallel computer system tends to be affected by the speed of collective communication. In particular, in a multi-layered fullmesh system in which a plurality of layers of fullmesh systems, having Leaf switches fullmesh-connected to each other, are connected to each other, a method of performing collective communication within nodes having either an intra-layer or inter-layer connection relationship with a Leaf switch is considered as one method of performing collective communication. When the performance of the parallel computer system varies in collective communication in a case where nodes having an intra-layer connection relationship with a Leaf switch is selected and collective communication in a case where a node group having an inter-layer connection relationship with a Leaf switch is selected, it is desired that a node group for processing a job with high performance is selected.

In one aspect, an object of the present embodiment is to appropriately assign nodes for executing parallel processing from node groups having either an intra-layer or inter-layer connection relationship with a Leaf switch.

Hereinafter, an embodiment will be described with reference to the accompanying drawings. Meanwhile, in this specification and drawings, components having substantially the same functional configuration will be denoted by the same reference numerals, and a repeated description will be omitted here.

Multi-Layered Fullmesh System

First, a method of connecting nodes for arithmetically operating an application in parallel in a parallel processing system according to an embodiment will be described with reference to FIG. 1. FIG. 1 illustrates an example of a multi-layered fullmesh system according to an embodiment. FIG. 1 illustrates a case of d=3 in a multi-layered fullmesh system of topology in which d layers of (d+1)-sided polygonal fullmesh systems are connected to each other.

In FIG. 1, all Leaf switches a1, b1, c1, and d1 in a layer have a relationship of fullmesh connection in consideration of a case except for spine switches. Specifically, when focusing on only Leaf switches, the Leaf switch a1 and the Leaf switch b1 are directly connected to each other, the Leaf switch a1 and the Leaf switch c1 are directly connected to each other, and the Leaf switch a1 and the Leaf switch d1 are directly connected to each other. In addition, the Leaf switch b1 and the Leaf switch c1 are directly connected to each other, the Leaf switch b1 and the Leaf switch d1 are directly connected to each other, and the Leaf switch c1 and the Leaf switch d1 are directly connected to each other. Such connection is referred to as fullmesh. The Leaf switches a1 to d1 are network switches (for example, local area network (LAN) switches) which are connected to nodes. For example, InfiniBand may be used as the network.

A circle indicates a node, and a number in the circle indicates a node number. Nodes 0 to 35 are computers, such as servers, which perform communication using a communication library such as message passing interface (MPI). The nodes 0 to 2 are connected to the Leaf switch a1, the nodes 3 to 5 are connected to the Leaf switch b1, the nodes 6 to 8 are connected to the Leaf switch c1, and the nodes 9 to 11 are connected to the Leaf switch d1. In this manner, network topology of the Leaf switches a1 to d1 is fullmesh type topology (hereinafter, also referred to as "fullmesh topology"). In addition, a system in which network topology of a Leaf switch is fullmesh topology is referred to as a fullmesh system.

A multi-layered fullmesh system 100 according to the present embodiment has a structure in which fullmesh systems of first to third layers are connected to each other through spine switches. In FIG. 1, the fullmesh systems of the first to third layers which have four Leaf switches are connected to each other using spine switches A to F. A shaded quadrangle indicates a spine switch and is distinguished from a Leaf switch which is an unshaded quadrangle. The number of ports of each spine switch and the number of ports of each Leaf switch are six. Three nodes are connected to each Leaf switch. One spine switch is provided on a link between Leaf switches. Each spine switch includes two links in each fullmesh system, and is connected to two Leaf switches in each fullmesh system.

A communication network cable called a link is connected between a node and a Leaf switch and between a Leaf switch and a spine switch. The spine switch has a role in connecting layers of fullmesh systems. For example, the nodes 0 to 2 connected to the Leaf switch a1, the nodes 12 to 14 connected to the Leaf switch a2, and the nodes 24 to 26 connected to the Leaf switch a3 can communicate with each other through the spine switches A to C.

Figure 2:
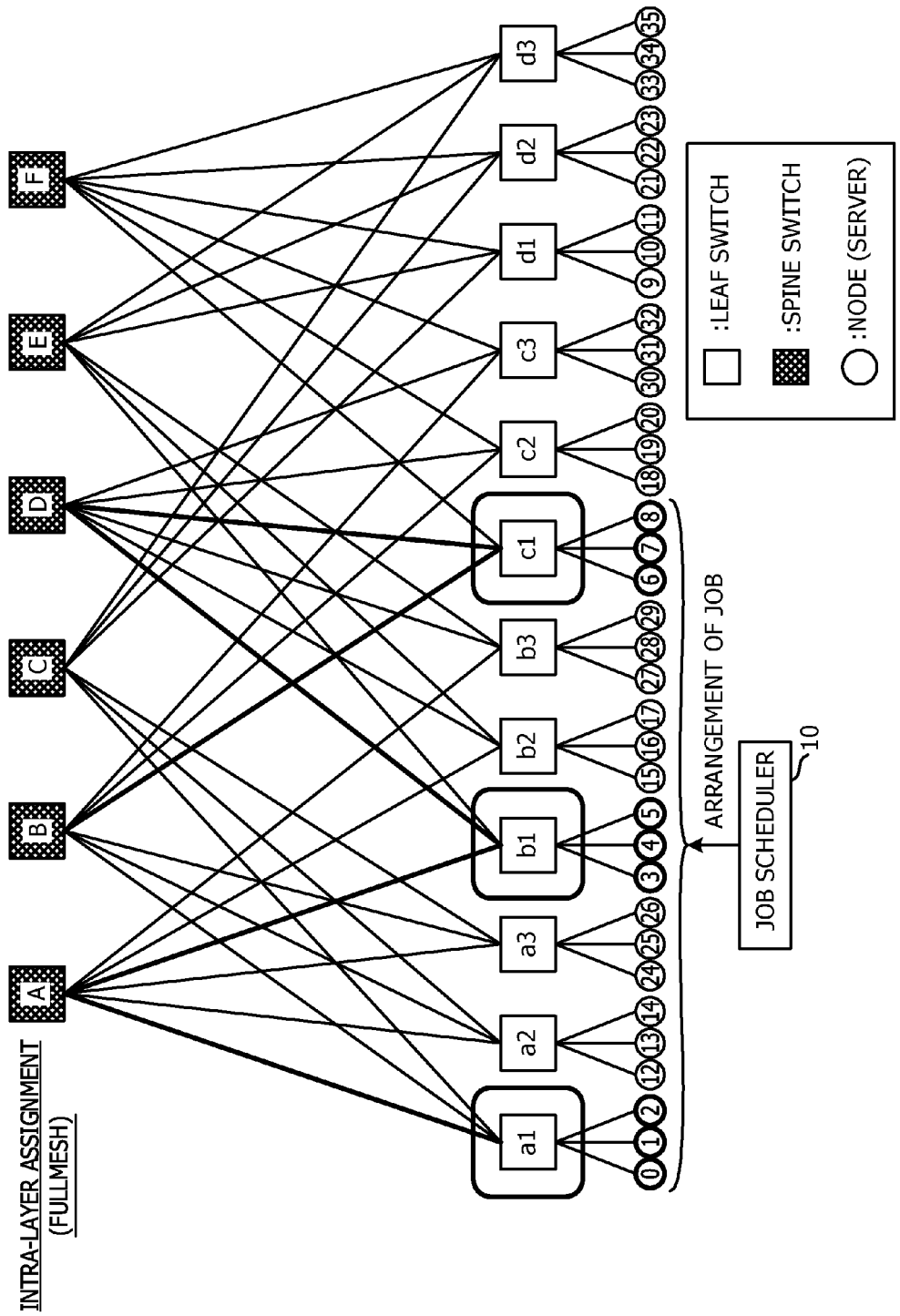
FIG. 2 illustrates intra-layer assignment (case of fullmesh) of nodes according to an embodiment.

Other methods for the multi-layered fullmesh system of FIG. 1 are as illustrated in FIGS. 2 and 3. A connection mode of systems of FIGS. 2 and 3 is completely the same as the connection mode of the system of FIG. 1. FIG. 2 illustrates intra-layer assignment (case of fullmesh) of nodes according to an embodiment, and illustrates topology of intra-layer assignment in which nodes having an intra-layer connection relationship with a Leaf switch are assigned to a parallel arithmetic operation of applications. The connection between the intra-layered assigned nodes is fullmesh topology.

FIG. 3 illustrates inter-layer assignment (case of fattree) of nodes according to an embodiment, and illustrates topology of inter-layer assignment in which nodes having a layer-bridging connection relationship with a Leaf switch are assigned to a parallel arithmetic operation of applications. The connection between the inter-layer assigned nodes is fattree type topology (hereinafter, also referred to as "fattree topology").

As illustrated in FIG. 2, the nodes 0 to 8 connected to the Leaf switches a1, b1, and c1 in the fullmesh system of the first layer illustrated in FIG. 1 are assigned as computers that perform a parallel arithmetic operation of applications. The arrangement of a job for the nodes 0 to 8 is performed by a job scheduler 10 to be described later.

As illustrated in FIG. 3, the nodes 0 to 2, the nodes 12 to 14, and the nodes 24 to 26 connected to the Leaf switches a1, a2, and a3 between the fullmesh systems of the first to third layers illustrated in FIG. 1 are assigned as computers that perform a parallel arithmetic operation of applications. In a case of the fullmesh of FIG. 2, the number of links between switches is "1", and nodes are connected to each other through one link. On the other hand, in a case of the fattree of FIG. 3, the number of links between switches is "3", and nodes are connected to each other through three links. In this manner, fattree topology and fullmesh topology are different connection methods.

Evaluation

Communication between nodes is determined by a maximum value of a communicable amount per unit time in accordance with the number of links. Accordingly, fattree topology, having a large number of links, has a larger maximum value of the amount of communication than that of fullmesh topology. For this reason, in a job having a large amount of communication, it is hypothesized that a job can be processed with higher performance by assigning node groups having an inter-layer connection relationship with a Leaf switch, than a case where node groups having an intra-layer connection relationship with a Leaf switch are assigned. Evaluation on which of node groups having an intra-layer or inter-layer connection relationship with a Leaf switch has higher communication throughput, that is, has higher performance is performed for each communication pattern, based on the hypothesis.

In the present embodiment, examples of a communication pattern include bitcomp, bitrev, neighbor, shuffle, tornado, transpose, and uniform which are used in a scientific calculation application illustrated in FIG. 4. FIG. 4 illustrates examples of communication patterns which are used for evaluation according to an embodiment.

In evaluation, communication patterns are defined by Expression (1) indicating bitcomp, Expression (2) indicating bitrev, and Expression (3) indicating neighbor. In addition, communication patterns are defined by Expression (4) indicating shuffle, Expression (5) indicating tornado, and Expression (6) indicating transpose.

Here, uniform is a communication pattern in which sources transmit the same amount of traffic to respective transmission destinations. For example, when processes A, B, C, and D are present, communication occurs equally from each process to the other processes in such a manner that the process A transmits data to the processes B, C, and D, and the process B transmits data to the processes A, C, and D.

Figure 5:
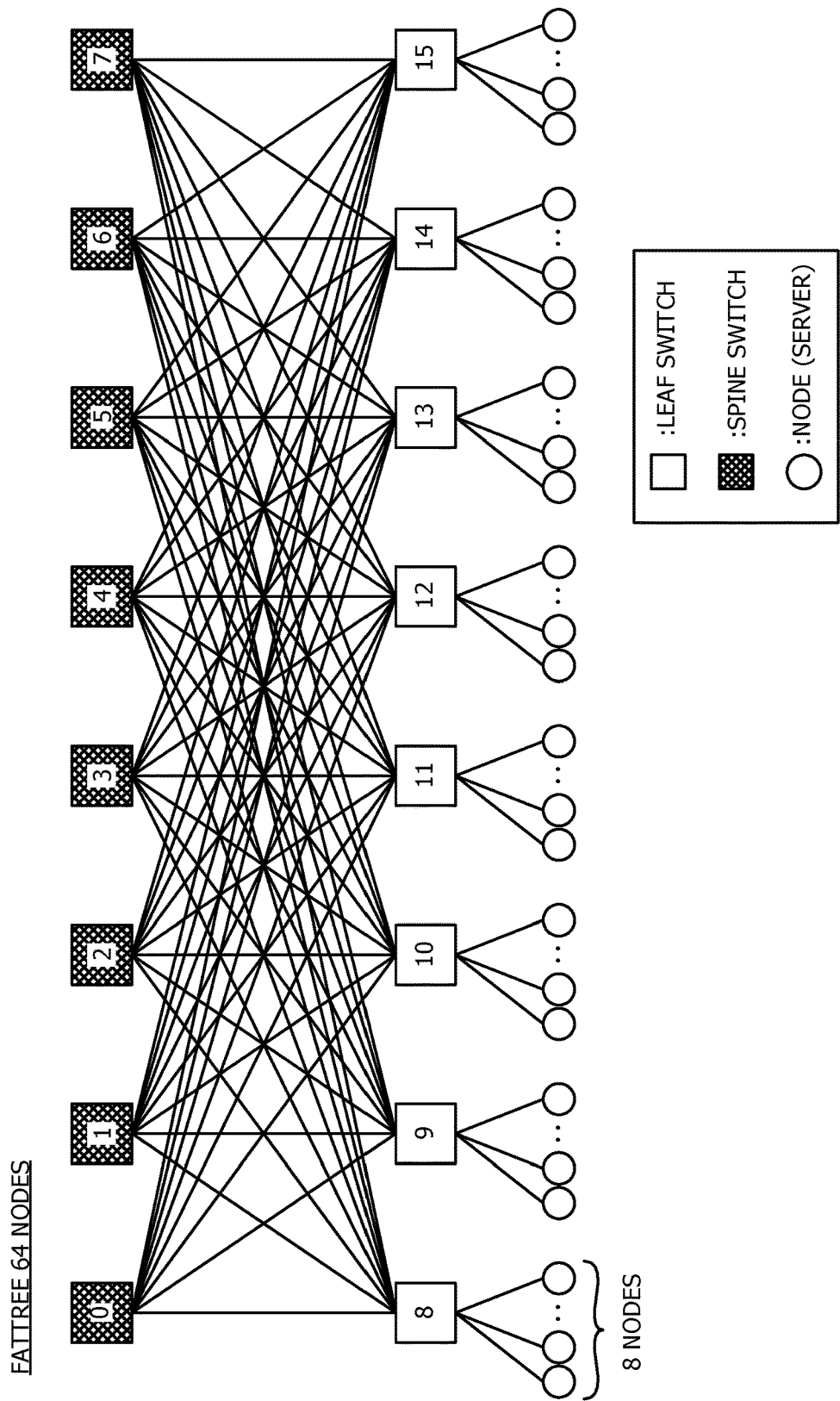
FIG. 5 illustrates an example of fattree topology according to an embodiment.

The communication patterns indicated by Expressions (1) to (6) and the communication pattern of uniform are evaluated using a network simulator such as a Booksim simulator which is a cycle-accurate network simulator. In the evaluation, a delay state of a packet with respect to an injection rate of the packet is evaluated. The above-mentioned communication patterns can be evaluated by a connection method such as fattree topology of 64 nodes illustrated in FIG. 5 or fullmesh topology of 64 nodes illustrated in FIG. 6 using a network simulator. FIG. 5 illustrates an example of fattree topology according to an embodiment, and FIG. 6 illustrates an example of fullmesh topology according to an embodiment.

Figure 7B:
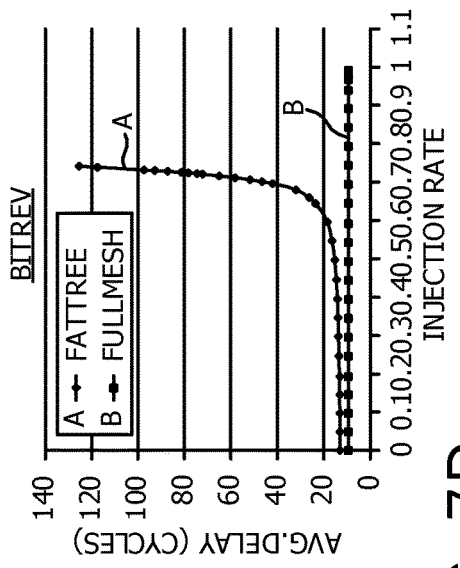
FIGS. 7A, 7B, 7C, and 7D illustrate a communication delay with respect to an injection rate of a packet according to an embodiment.
Figure 7D:
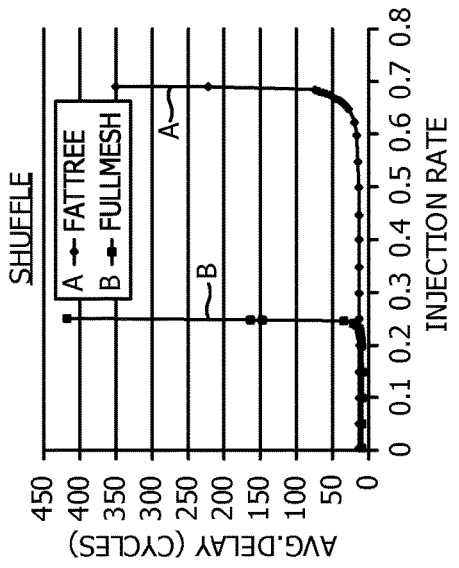
Figure 7A:
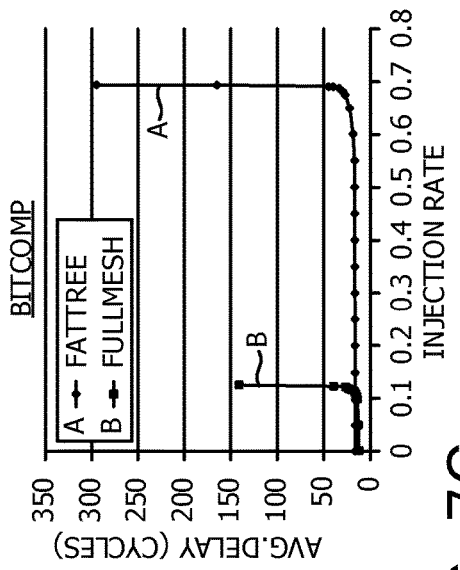
Figure 7C:
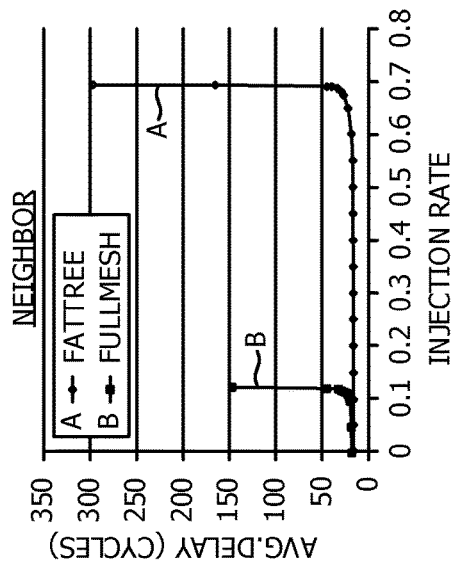
Figure 8B:
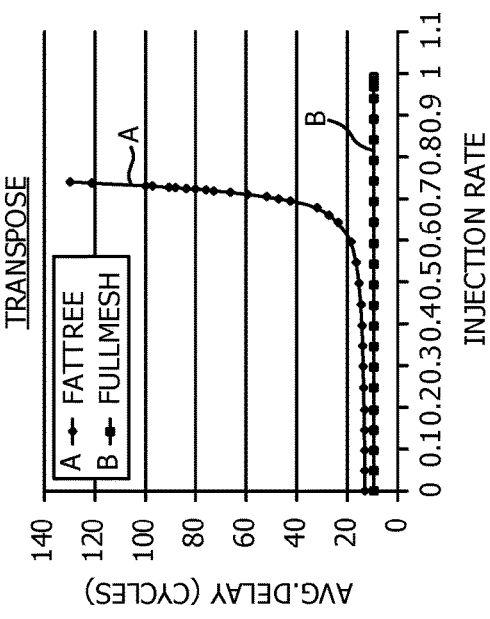
FIGS. 8A, 8B, and 8C illustrate a communication delay with respect to an injection rate of a packet according to an embodiment.
Figure 8A:
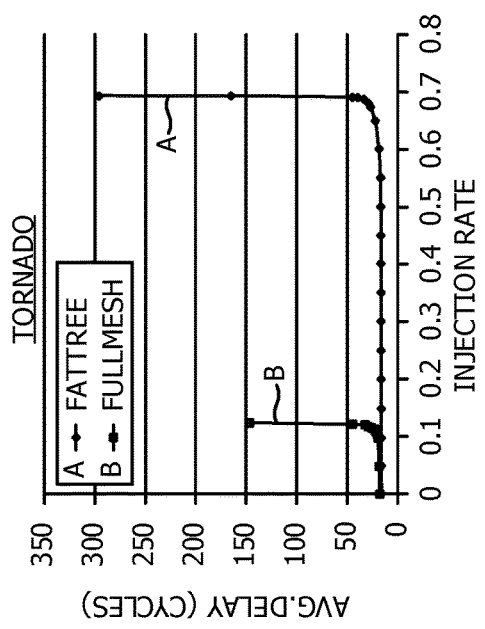
Figure 8C:
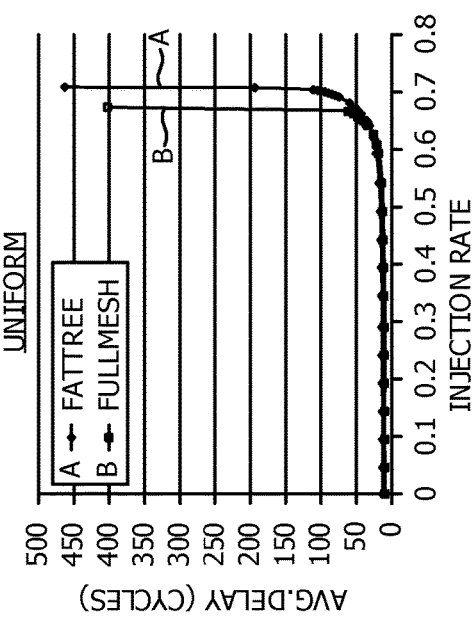

FIGS. 7A, 7B, 7C, and 7D and FIGS. 8A, 8B, and 8C illustrate results of the evaluation of the communication patterns illustrated in FIG. 4. FIGS. 7A to 7D illustrate a communication delay with respect to an injection rate of a packet according to an embodiment. FIGS. 8A to 8C illustrate a communication delay with respect to an injection rate of a packet according to an embodiment. FIG. 7A illustrates results of the evaluation of bitcomp. An injection rate of a packet in the horizontal axis is the number of packets that are injected for each one cycle time. For example, in a case of a CPU of 1 MHz, one million-cycle processing can be performed for one second, and a time of one cycle is calculated by one second/one million cycles. The vertical axis represents an average value of a communication delay (hereinafter, also referred to as an "average communication delay" (delay)) by a cycle time.

In graphs of FIGS. 7A to 7D and FIGS. 8A to 8C, an average communication delay (cycles) of a packet with respect to an injection rate up to before the average communication delay exceeds 500 cycles is plotted. Topology indicating a larger value of an injection rate until a graph indicating an average communication delay rises indicates that a delay is not increased in spite of the injection of a larger number of packets, that is, higher throughput.

In "bitcomp" of FIG. 7A, in a case of fullmesh topology, when the number of packets injected for a time of one cycle exceeds "0.1", an average communication delay rises and reaches a time of approximately 150 cycles. This indicates that a load is applied to a network when the number of packets injected for a time of one cycle exceeds "0.1" in a case of fullmesh topology, which results in a state where communication is immediately not transmitted to a target server which is a transmission destination in spite of the injection of packets.

On the other hand, in a case of fattree topology, when the number of packets injected for a time of one cycle is set to approximately "0.7", an average communication delay reaches a time of approximately 300 cycles. Therefore, in a case of bitcomp, a job in a case of fattree topology is processed with higher performance than in a case of fullmesh topology. That is, in a job having a communication pattern of "bitcomp", it is preferable to assign nodes between layers.

In "bitrev" of FIG. 7B, in a case of fullmesh topology, even when the number of packets injected for a time of one cycle is set to "1", there is no sudden rise in an average communication delay. On the other hand, in a case of fattree topology, when the number of packets injected for a time of one cycle is set to approximately "0.7", an average communication delay reaches a time of 120 cycles. Therefore, in a case where a job having the same communication as that of the communication pattern of bitrev is executed, a job in a case of fullmesh topology is processed with higher performance than in a case of fattree topology. That is, in a job having a communication pattern of "bitrev", it is preferable to assign nodes in a layer.

In "neighbor" of FIG. 7C, an average communication delay in a case of fattree topology does not rise until the number of packets injected is increased, as compared to fullmesh topology. Therefore, in a case of neighbor, a job in a case of fattree topology is processed with higher performance than in a case of fullmesh topology. That is, in a job having a communication pattern of "neighbor", it is preferable to assign nodes between layers.

In "shuffle" of FIG. 7D, an average communication delay in a case of fattree topology does not rise until the number of packets injected is increased, as compared to fullmesh topology. Therefore, in a case of shuffle, a job in a case of fattree topology is processed with higher performance than in a case of fullmesh topology. That is, in a job having a communication pattern of "shuffle", it is preferable to assign nodes between layers.

In "tornado" of FIG. 8A, an average communication delay in a case of fattree topology does not rise until the number of packets injected is increased, as compared to fullmesh topology. Therefore, in a case of tornado, a job in a case of fattree topology is processed with higher performance than in a case of fullmesh topology. That is, in a job having a communication pattern of "tornado", it is preferable to assign nodes between layers.

In "transpose" of FIG. 8B, in a case of fullmesh topology, even when the number of packets injected for a time of one cycle is set to "1", there is no sudden rise in an average communication delay. On the other hand, in a case of fattree topology, when the number of packets injected for a time of one cycle is set to approximately "0.7", an average communication delay reaches a time of 120 cycles. Therefore, in a case of transpose, a job in a case of fullmesh topology is processed with higher performance than in a case of fattree topology. That is, in a job having a communication pattern of "transpose", it is preferable to assign nodes in a layer.

In a communication pattern of "uniform" of FIG. 8C, in a case of fattree topology, when the number of packets injected for a time of one cycle exceeds "0.7", an average communication delay reaches a time of 450 cycles. On the other hand, in a case of fullmesh topology, an average communication delay is set to a time of 400 cycles before the number of packets injected for a time of one cycle exceeds "0.7". Therefore, in a case of uniform, a job in a case of fattree topology is processed with higher performance than in a case of fullmesh topology. That is, in a job having a communication pattern of "uniform", it is preferable to assign nodes between layers.

FIG. 9 illustrates an example of evaluation results according to an embodiment. FIG. 9 illustrates an example of evaluation results according to the present embodiment described above. In FIG. 9, a circle is attached to topology indicating a higher injection rate with respect to each communication pattern. In a communication pattern in which a circle is attached to fattree topology, a job is executed with higher performance in a case where assignment to nodes having an inter-layer connection relationship with a Leaf switch is performed than in a case where assignment to nodes in a layer is performed. In a communication pattern in which a circle is attached to fullmesh topology, a job is executed with higher performance in a case where assignment to nodes in a layer than in a case where assignment to nodes between layers. Depending on communication patterns, a communication pattern capable of achieving high performance in a case of fullmesh topology is present, which indicates that high performance is not necessarily achieved in a case of fattree topology, unlike the original hypothesis. Accordingly, when a communication pattern executed by an application can be determined, it is possible to determine node groups, having an intra-layer or inter-layer connection relationship with a Leaf switch, to which the assignment has to be made, as node groups capable of executing an application at higher speed, and to efficiently use resources of a multi-layered fullmesh system.

Figure 10:
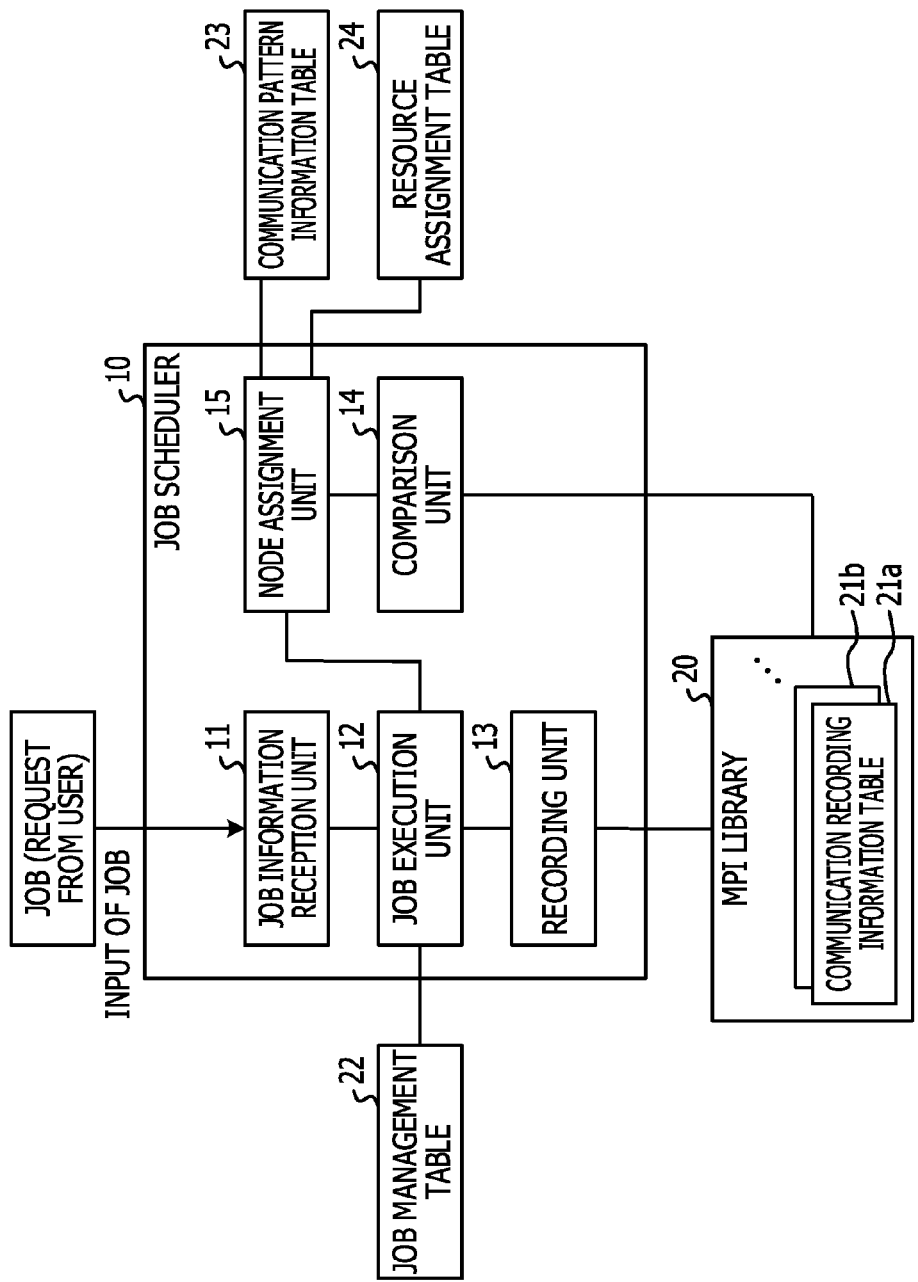
FIG. 10 illustrates an example of a functional configuration of a job scheduler according to an embodiment.

Hereinafter, it is determined to which of predetermined communication patterns communication occurring in an application is most similar, and a description will be given of functions and operations of the job scheduler 10 that appropriately assigns nodes for executing parallel processing from nodes having an intra-layer or inter-layer connection relationship with a Leaf switch, based on information regarding assignment of nodes that process the similar communication pattern with high performance. First, the functions of the job scheduler 10 will be described with reference to FIG. 10. FIG. 10 illustrates an example of a functional configuration of a job scheduler according to an embodiment.

Job Scheduler

The job scheduler 10 selects which nodes are used for the execution of a job, and executes the job using the selected nodes. The job scheduler 10 determines a communication pattern of an application to thereby realize the efficient execution of a job by the appropriate assignment to nodes in a multi-layered fullmesh system of a job. The job scheduler 10 is an example of a parallel arithmetic operation apparatus that performs a parallel arithmetic operation of applications in the multi-layered fullmesh system 100 in which a plurality of layers of fullmesh systems having a Leaf switch connected thereto are connected to each other.

Examples of the job scheduler 10 (resource and job management system (RJMS)) include Simple Linux Utility for Resource Management (Slurm), a Portable Batch System (PBS), and the like, and the job scheduler secures arithmetic operation resources (nodes) and executes a job.

The job scheduler 10 includes a job information reception unit 11, a job execution unit 12, a recording unit 13, a comparison unit 14, and a node assignment unit 15. When a job is input from a user, the job information reception unit 11 receives job information which is information regarding a requested job. The job information includes pieces of information such as the number of nodes used for the execution of the job, an execution command, power for a parallel arithmetic operation, and the like.

The job execution unit 12 performs a parallel arithmetic operation using nodes having an intra-layer or inter-layer connection relationship with a Leaf switch. The assignment of nodes used for an application is determined by the node assignment unit 15. Assigned node information is transmitted to the job execution unit 12.

An application executed in a system constituted by a plurality of calculation nodes connected to each other through a network is generally constituted by a plurality of processes. An execution substance constituting an application is referred to as a process. An MPI library 20 is used for communication between a plurality of processes. The recording unit 13 counts communication between the processes at the time of executing an application for each set of (transmission sources, transmission destinations), and records the counted communication in the MPI library 20. Specifically, the recording unit 13 records the number of times of communication between processes in communication recording information tables 21a, 21b, . . . (hereinafter, collectively referred to as a "communication recording information table 21") of the MPI library 20. The processes are assigned in a manner of, for example, one process per node, and are executed by the assigned node. Therefore, it can be said that communication recording information having the number of times of communication between nodes at the time of executing an application recorded therein is stored in the communication recording information table 21.

FIGS. 11A and 11B illustrate examples of a communication recording information table according to an embodiment. For example, FIGS. 11A and 11B illustrate examples of communication recording information recorded in the communication recording information table 21 in a case where four processes 0, 1, 2, 3 constituting an application perform communication between processes. FIG. 11A illustrates an example in which the recording unit 13 counts the number of times of each communication of the process 0→the process 3, the process 1→the process 2, the process 2→the process 1, and the process 3→the process 0, and records the counted number in a communication recording information table 21a. When the above-mentioned communication is performed 1000 times, communication recording information indicated by a matrix A is recorded in the communication recording information table 21a.

Rows of the matrix A are the transmission source processes 0, 1, 2, and 3, and columns thereof are the transmission destination processes 0, 1, 2, and 3. Each communication of the process 0→the process 3, the process 1→the process 2, the process 2→the process 1, and the process 3→the process 0 performed 1000 times is recorded. Meanwhile, the matrix A indicates a communication pattern of bitcomp.

FIG. 11B illustrates an example in which the recording unit 13 records the number of times of each communication of the process 0→the processes 1, 2, and 3, the process 1→the processes 0, 2, and 3, the process 2→the processes 0, 1, and 3, and the process 3→the processes 0, 1, and 2 in a communication recording information table 21b. When the above-mentioned communication is performed 1000 times, communication recording information indicated by a matrix B is recorded in the communication recording information table 21b. Each communication of the process 0→the processes 1, 2, and 3, the process 1→the processes 0, 2, and 3, the process 2→the processes 0, 1, and 3, and the process 3→the processes 0 to 2 performed 1000 times is recorded. Meanwhile, the matrix B indicates a communication pattern of uniform. In this manner, in a case where communication recording information between processes is indicated by a matrix, the information is indicated by a 4×4 matrix in a case of four processes. Each element of the matrix indicates the number of times of communication. The matrices A and B are examples of communication recording information.

The comparison unit 14 compares communication recording information recorded in the communication recording information table 21 with communication pattern information recorded in a communication pattern information table 23.

Figure 12:
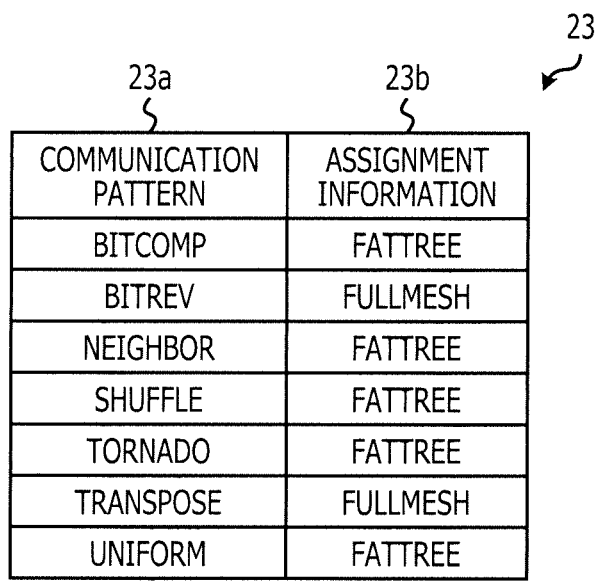
FIG. 12 illustrates an example of a communication pattern information table according to an embodiment.

FIG. 12 illustrates an example of a communication pattern information table according to an embodiment. As illustrated in FIG. 12, in the communication pattern information table 23, assignment information 23b indicating which nodes having an intra-layer or inter-layer connection relationship with a Leaf switch are assigned is set for each communication pattern 23a. Communication patterns used in the present embodiment are bitcomp, bitrev, neighbor, shuffle, tornado, transpose, and uniform. The assignment information 23b is specified for each communication pattern based on the above-described evaluation results (see FIG. 9). In assignment information 23b of a communication pattern in which an increase in the performance of a job is evaluated in a case of fattree topology, fattree is recorded. In assignment information 23b of a communication pattern in which an increase in the performance of a job is evaluated in a case of fullmesh topology, fullmesh is recorded.

The node assignment unit 15 extracts communication pattern 23a which is the most similar to communication indicated by communication recording information of the compared communication recording information table 21 from the communication pattern information table 23. The node assignment unit 15 assigns nodes that subsequently execute an application, based on assignment information 23b associated with the extracted communication pattern 23a. In a case where fattree is set in assignment information 23b, the node assignment unit 15 assigns nodes having an inter-layer connection relationship with a Leaf switch. In a case where fullmesh is set in assignment information 23b, the node assignment unit 15 assigns nodes having an intra-layer connection relationship with a Leaf switch.

The comparison unit 14 calculates a distance between a matrix of communication recording information and a matrix of a communication pattern in order to extract a communication pattern 23a which is the most similar to communication indicated by communication recording information of the communication recording information table 21. The distance is calculated in the following order using elements of a matrix. However, the order of calculating the distance is not limited thereto.

FIG. 13 is a diagram illustrating the calculation of a distance according to an embodiment. For example, when it is assumed that communication recording information of a matrix A of FIG. 13 is obtained during the execution of a certain application, the comparison unit 14 multiplies a matrix indicating each predetermined communication pattern by a maximum value of elements of a matrix A to thereby normalize the communication pattern. The maximum value of the elements of the matrix A illustrated in FIG. 13 is "1000". Accordingly, the comparison unit 14 multiplies each element of a matrix (only a matrix of communication patterns of bitcomp and neighbor is illustrated in FIG. 13) which indicates each communication pattern by 1000 to thereby normalize the communication pattern.

Next, each element of the matrix A is substituted for $x_{ij}$ of Expression (7), and each element of the matrix of the normalized communication pattern is substituted for $y_{ij}$ of Expression (7), thereby calculating a distance, that is, the degree of a difference between the two matrices. That is, the distance is expressed as the sum of the square roots of the square of a difference between elements of the respective matrices as indicated by Expression (7). However, Expression (7) is an example of a method of calculating a distance. On contrary, it can be said that two matrices become similar to each other as a distance between the two matrices decreases. Consequently, in the present embodiment, it is said that the matrices become similar to each other as the distance calculated by Expression (7) becomes closer to 0.

$$\sum_{i=1}^{n}\sum_{j=1}^{n}\sqrt{(x_{ij}-y_{ij})^2} \qquad (7)$$

As a result of the calculation, a distance between the matrix A and the bitcomp pattern is set to "0".

Similarly, when it is assumed that communication recording information of a matrix B of FIG. 13 is obtained during the execution of a certain application, the comparison unit 14 multiplies each communication pattern by a maximum value of elements of the matrix B to thereby perform normalization. The comparison unit substitutes each element of the matrix B for $x_{ij}$ of Expression (7), and substitutes each element of the matrix of the normalized communication pattern for $y_{ij}$. As a result, a distance between the matrix B and the bitcomp pattern is set to "8000". In this manner, the comparison unit 14 performs calculation of distances from all communication patterns, and defines the most similar communication pattern.

The node assignment unit 15 extracts a communication pattern which is the most similar to communication recording information during the execution of an application. The communication pattern which is the most similar to communication recording information is a communication pattern having the shortest distance. In the above-mentioned example, as a result of the comparison, it is determined that the matrix A (communication recording information) is similar to the communication pattern of bitcomp.

The comparison unit 14 stores the most similar communication pattern in a job management table 22. FIG. 14 illustrates an example of a job management table according to an embodiment. A user name 22a of a user having requested a job and an application name 22b of an application requested by the user are recorded in the job management table 22. After the application is analyzed, a communication pattern 22c determined to be the most similar to communication during the execution of the application is recorded.

For example, in a case where a communication pattern which is the most similar to communication recording information during the execution of an application having a user name 22a being "user001" and having an application name 22b being "A" is determined to be "uniform", "uniform" is recorded in a communication pattern 22c corresponding to the user name 22a and the application name 22b. Meanwhile, data recorded in the job management table 22 may be deleted after a predetermined period of time elapses.

The node assignment unit 15 extracts assignment information 23b of a communication pattern 23a which is the most similar to communication recording information during the execution of an application, based on the communication pattern information table 23. In the above-mentioned example, the matrix A is determined to be similar to the communication pattern of bitcomp, and thus the node assignment unit 15 extracts fattree.

The node assignment unit 15 assigns nodes having an intra-layer or inter-layer connection relationship with a Leaf switch from the extracted assignment information 23b, based on a resource assignment table 24. FIG. 15 illustrates an example of a resource assignment table according to an embodiment. A node group ID 24a, a fullmesh number 24b, a fattree number 24c, and an assigned information 24d are recorded in the resource assignment table 24. Here, the node group ID is an identifier attached to nodes connected to the same Leaf switch. In the example of FIG. 1, one node group includes three nodes. In one example, nodes for the execution of a job are assigned using the node group as a unit. When the same symbol is selected among symbols written in the fullmesh number 24b of the resource assignment table 24, nodes having an intra-layer connection relationship with a Leaf switch is selected. In addition, when the same symbol is selected among symbols written in the fattree number 24c, nodes having an inter-layer connection relationship with a Leaf switch is selected.

In a case where an extracted communication pattern is "uniform", the node assignment unit 15 selects nodes having the same fattree number 24c of the resource assignment table 24 because the assignment information 23b is "fattree" and assigned information 24d being "No" (unassigned nodes). The node assignment unit 15 assigns the selected nodes to a node to be used when an application is executed next. For example, the node assignment unit 15 can assign "node 001" and "node 063" having the fattree number 24c of the resource assignment table 24 being "T2". Node information herein is "node 001" and "node 063".

The job execution unit 12 acquires node information assigned by the node assignment unit 15 and executes a job using assigned nodes.

Node Assignment Process

Figure 16:
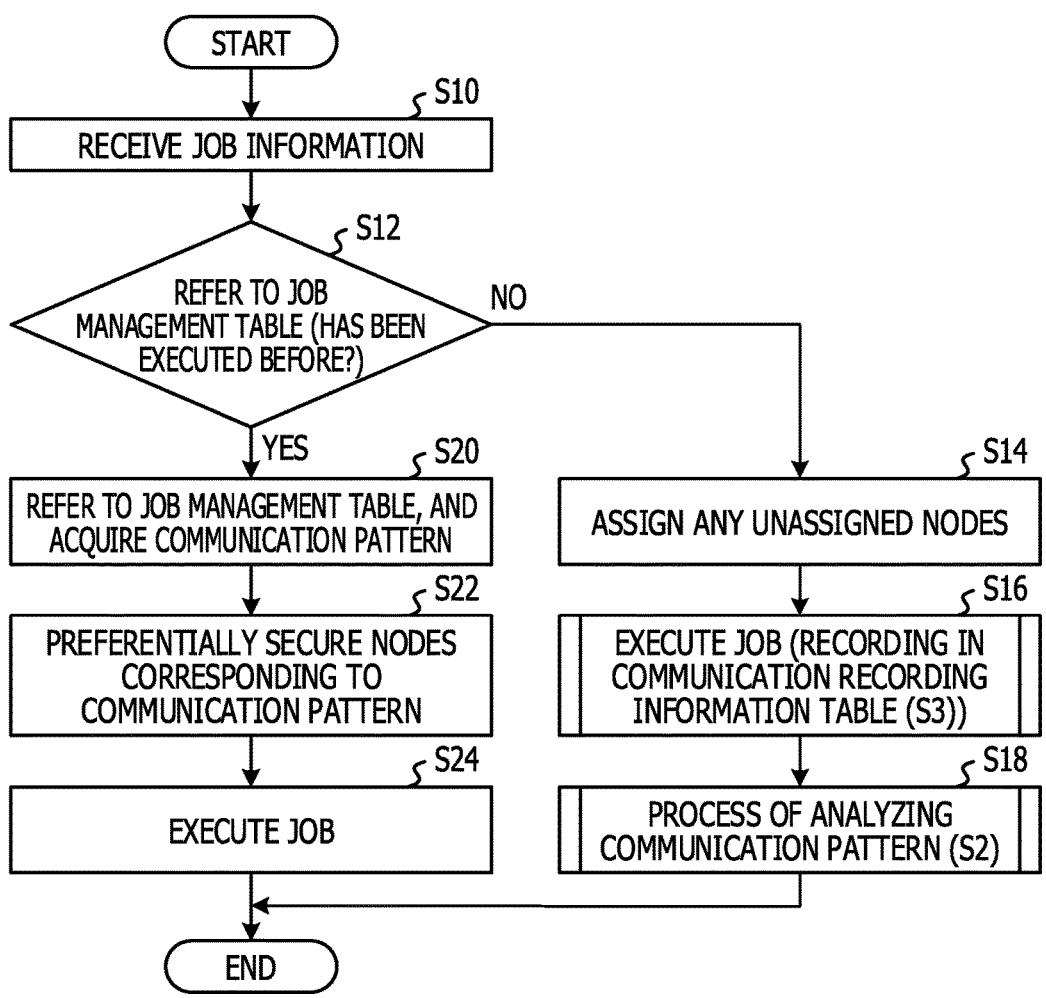
FIG. 16 is a flow chart illustrating an example of a node assignment process according to an embodiment.

Next, a node assignment process according to the present embodiment will be described with reference to FIG. 16. FIG. 16 is a flow chart illustrating an example of a node assignment process according to the present embodiment. When the process is started, the job information reception unit 11 first receives job information regarding a job requested from a user (step S10).

Next, the job execution unit 12 determines whether a communication pattern similar to communication having a user name and an application which are included in job information has been already executed and is set in the job management table 22, with reference to the job management table 22 (step S12).

In a case where the job execution unit 12 determines that a communication pattern has not been extracted, the node assignment unit 15 assigns nodes indicated in job information from any unassigned nodes having either an intra-layer or inter-layer connection relationship with a Leaf switch, with reference to the assigned information 24d of the resource assignment table 24 (step S14).

Next, the job execution unit 12 executes a job using the assigned nodes (step S16). During the execution of the job, the recording unit 13 counts communication between processes whenever communication occurs, and records the counted communication in the communication recording information table 21 of the MPI library 20 (step S16: S3).

(Communication Information Recording Process (S3))

Figure 17:
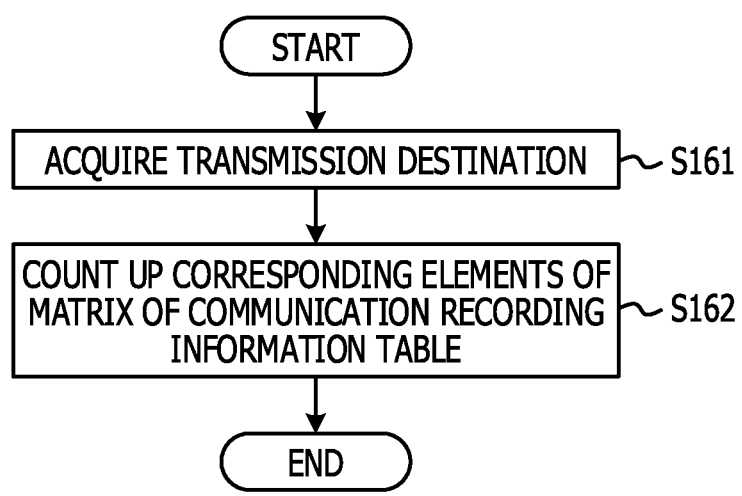
FIG. 17 is a flow chart illustrating an example of a communication information recording process according to an embodiment.

A communication information recording process (S3) called from step S16 of FIG. 16 will be described with reference to FIG. 17. FIG. 17 is a flow chart illustrating an example of a communication information recording process according to an embodiment. In the communication information recording process (S3), the recording unit 13 first acquires a number of a process which is a transmission destination (step S161). Next, the recording unit 13 counts up corresponding matrix elements of the communication recording information table 21 (step S162). The recording unit 13 counts up the number of times of communication whenever communication occurs from a transmission source process to a transmission destination process. A method of counting the number of times of communication may be a method of counting the number of times of communication from the start of the execution of an application to the termination of the execution of the application, or may be a method of counting up the number of times of communication for a predetermined period of time during the execution of the application.

The number of times of communication between processes is counted during the execution of an application by such processing, and the counted number is recorded in the communication recording information table 21 of the MPI library 20. The flow returns to a node assignment process of FIG. 16. Next, a process of analyzing a communication pattern (S2) is executed (step S18), and the processing is terminated.

(Process of Analyzing Communication Pattern (S2))

Figure 18:
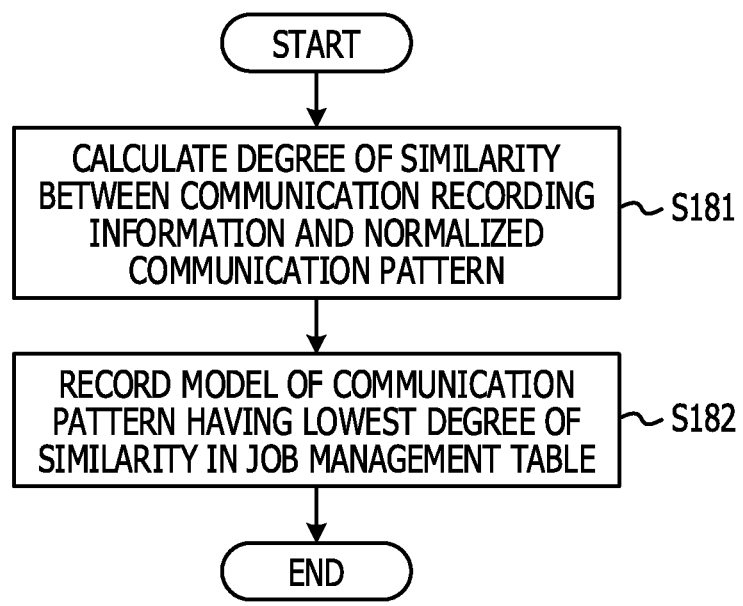
FIG. 18 is a flow chart illustrating an example of a process of analyzing a communication pattern according to an embodiment.

The process of analyzing a communication pattern (S2) which is called from step S18 of FIG. 16 will be described with reference to FIG. 18. FIG. 18 is a flow chart illustrating an example of a process of analyzing a communication pattern according to an embodiment. In the process of analyzing a communication pattern (S2), the comparison unit 14 substitutes each element of a matrix recorded in the communication recording information table 21 for $x_{ij}$ of Expression (7), and substitutes each element of a matrix of a normalized communication pattern for $y_{ij}$ of Expression (7) to thereby calculate a distance (step S181).

Next, the comparison unit 14 records a communication pattern having the shortest distance in the communication pattern 22c of the job management table 22 (step S182), and the processing is terminated.

On the other hand, in step S12 of the node assignment process of FIG. 16, a description will be given of a case where it is determined that a communication pattern having a user name and an application name which are included in job information has been already executed and is set in the job management table 22. In this case, the node assignment unit 15 acquires a communication pattern 22c corresponding to a user name 22a and an application name 22b which are included in job information, based on the job management table 22 (step S20). That is, the node assignment unit 15 extracts a communication pattern which is the most similar to communication indicated by communication recording information at the time of first executing an application, from the job management table 22.

Next, the node assignment unit 15 selects assignment information 23b corresponding to a communication pattern 23a of the communication pattern information table 23 which is specified by the acquired communication pattern 22c. The node assignment unit 15 selects and secures nodes according to intra-layer or inter-layer assignment corresponding to the selected assignment information 23b from the resource assignment table 24 (step S22). For example, in a case where the assignment information 23b indicates intra-layer assignment (fullmesh), nodes that are not assigned and have fullmesh numbers 24b of the same symbol are selected based on the fullmesh number 24b and the assigned information 24d. For example, in a case where the assignment information 23b indicates inter-layer assignment (fattree), nodes that are not assigned and have fattree numbers 24c of the same symbol are selected based on the fattree number 24c and the assigned information 24d. Next, the job execution unit 12 executes a job using assigned nodes (step S24), and the processing is terminated.

As described above, according to a parallel processing system that performs a parallel arithmetic operation of applications according to an embodiment, nodes for executing parallel processing in the multi-layered fullmesh system 100 are appropriately assigned from nodes having an intra-layer or inter-layer connection relationship with a Leaf switch. Thereby, the processing speed of a job is improved, and the throughput of a parallel computer system is improved. Thereby, it is possible to optimally use calculation resources of a PC cluster constituted by the multi-layered fullmesh system 100.

In the above description, a set of nodes constituting fullmesh is limited to a set in which the numbers of Leaf switches in the same layer are the same as each other, but is not limited thereto. A set of nodes may constitute fullmesh by different layers. FIGS. 19A and 19B illustrate other examples of fullmesh topology according to an embodiment. For example, in FIG. 19A, a set of nodes constituting fullmesh is a node group in a layer connected to Leaf switches a1, b1, and c1. However, in FIG. 19B, a set of nodes constituting fullmesh may be a node group straddling between layers connected to Leaf switches a1, b2, and c3.

Hardware Configuration Example

Figure 20:
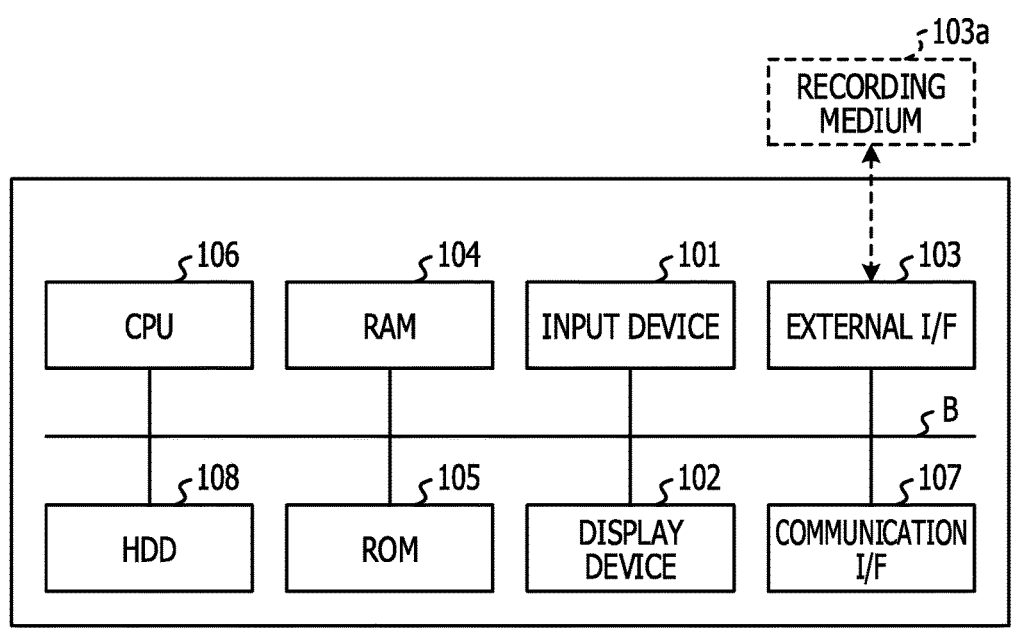
FIG. 20 illustrates a hardware configuration example of a job scheduler according to an embodiment.

Finally, a hardware configuration of the job scheduler 10 according to the present embodiment will be described with reference to FIG. 20. FIG. 20 illustrates a hardware configuration example of a job scheduler according to an embodiment. The job scheduler 10 includes an input device 101, a display device 102, an external I/F circuit 103, a random access memory (RAM) 104, a read only memory (ROM) 105, a central processing unit (CPU) 106, a communication I/F circuit 107, a hard disk drive (HDD) 108, and the like that are connected to each other through a bus B.

The input device 101 includes a keyboard, a mouse, or the like, and is used to input operation signals to the job scheduler 10. The display device 102 includes a display or the like, and displays various processing results. The communication I/F circuit 107 is an interface for connecting the job scheduler 10 to a network. Thereby, the job scheduler 10 performs data communication with a node group through the communication I/F circuit 107.

The HDD 108 is a non-volatile storage device that stores a program or data. The stored program or data includes basic software and application software for controlling the overall job scheduler 10. For example, the HDD 108 may store various databases or a program such as a node assignment program.

The external I/F circuit 103 is an interface with an external device. Examples of the external device include a recording medium 103a and the like. Thereby, the job scheduler 10 performs reading and/or writing from and/or in the recording medium 103a through the external I/F circuit 103. Examples of the recording medium 103a include a compact disk (CD), a digital versatile disk (DVD), a SD memory card, a universal serial bus (USB) memory, and the like.

The ROM 105 is a non-volatile semiconductor memory (storage device) that stores internal data even when power is turned off. The ROM 105 stores programs and data. The RAM 104 is a volatile semiconductor memory (storage device) that temporarily stores a program, such as a node assignment program, or data. The CPU 106 reads out the program, such as a node assignment program, or the data on the RAM 104 from the above-mentioned storage device (for example, the "HDD 108", the "ROM 105", or the like), and executes a node assignment process, a communication information recording process, and a process of analyzing a communication pattern. Thereby, the control of arrangement of a job and a parallel arithmetic operation of applications in a multi-layered fullmesh system are realized.

Meanwhile, pieces of information stored in the communication recording information table 21, the job management table 22, the communication pattern information table 23, and the resource assignment table 24 may be stored in the RAM 104, the HDD 108, or the like. The tables may be stored in a server or the like on a cloud connected to the job scheduler 10 through a network.

Although the parallel arithmetic operation apparatus, the parallel processing system, the node assignment program, and the method of assigning nodes have been described so far by the above-described embodiment, the parallel arithmetic operation apparatus, the parallel processing system, the node assignment program, and the method of assigning nodes according to the embodiment are not limited to the above-described embodiment, and various modifications and improvements can be made without departing from the scope of the embodiment. In addition, in a case where a plurality of embodiments and modification examples are present, the embodiments and modification examples can be combined with each other within a range that does not causing contradiction.

For example, the configuration of the job scheduler 10 according to the above-mentioned embodiment is an example, and does not limit the scope of the embodiment. In addition, it is needless to say that various system configuration examples are present depending on uses and purposes. For example, a parallel arithmetic operation apparatus having the job scheduler 10 according to the present embodiment as an example may be realized by an information processing apparatus which is provided separately from a node, or may be incorporated into the node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel processing system which is a multi-layered fullmesh system in which a plurality of layers of fullmesh systems, having a plurality of Leaf switches fullmesh-coupled to each other, are coupled to each other, the parallel processing system including a plurality of nodes, the parallel processing system being configured to perform a parallel arithmetic operation of applications, at least one of the plurality of nodes being coupled to each of the plurality of Leaf switches, the parallel processing system comprising:
   circuitry configured to:
      obtain communication recording information in which a number of times of communication between the plurality of nodes during execution of an application is recorded;
      obtain communication pattern information in which assignment information indicating which connection topology of a fullmesh topology and a fattree topology is to be selected for each a plurality of communication patterns, in the fullmesh topology, the plurality of nodes having an intra-layer connection relationship, and in the fattree topology, the plurality of nodes having inter-layer connection relationship;
      select a first communication pattern from the plurality of communication patterns based on the number of times of communication;

identify, based on the communication pattern information, a connection topology from the fullmesh topology and the fattree topology corresponding to the selected first communication pattern; and assign, based on the identified connection topology, nodes included in the parallel processing system that execute the application.

2. The parallel processing system according to claim 1, wherein the circuitry is configured to:

select the first communication pattern which is the most similar to communication indicated by communication recording information at the time of first executing the application, based on the communication pattern information.

3. A method executed by circuitry in a parallel processing system which is a multi-layered fullmesh system in which a plurality of layers of fullmesh systems, having a plurality of Leaf switches fullmesh-coupled to each other, are coupled to each other, the parallel processing system including a plurality of nodes, the parallel processing system being configured to perform a parallel arithmetic operation of applications, at least one of the plurality of nodes being coupled to each of the plurality of Leaf switches, the method comprising:

obtaining communication recording information in which a number of times of communication between the plurality of nodes during execution of an application is recorded;

obtaining communication pattern information in which assignment information indicating which connection topology of a fullmesh topology and a fattree topology is to be selected for each a plurality of communication patterns, in the fullmesh topology, the plurality of nodes having an intra-layer connection relationship, and in the fattree topology, the plurality of nodes having inter-layer connection relationship;

selecting a first communication pattern from the plurality of communication patterns based on the number of times of communication;

identifying, based on the communication pattern information, a connection topology from the fullmesh topology and the fattree topology corresponding to the selected first communication pattern; and assigning, based on the identified connection topology, nodes included in the parallel processing system that execute the application.

4. The method according to claim 3, further comprising:

selecting the first communication pattern which is the most similar to communication indicated by communication recording information at the time of first executing the application, based on the communication pattern information.

5. A non-transitory storage medium storing a program for causing circuitry in a parallel processing system to execute a process, the parallel processing system being a multi-layered fullmesh system in which a plurality of layers of fullmesh systems, having a plurality of Leaf switches fullmesh-coupled to each other, are coupled to each other, the parallel processing system including a plurality of nodes, the parallel processing system being configured to perform a parallel arithmetic operation of applications, at least one of the plurality of nodes being coupled to each of the plurality of Leaf switches, the process comprising:

obtaining communication recording information in which a number of times of communication between the plurality of nodes during execution of an application is recorded;

obtaining communication pattern information in which assignment information indicating which connection topology of a fullmesh topology and a fattree topology is to be selected for each a plurality of communication patterns, in the fullmesh topology, the plurality of nodes having an intra-layer connection relationship, and the fattree topology corresponding to the selected first communication pattern inter-layer connection relationship;

selecting a first communication pattern from the plurality of communication patterns based on the number of times of communication;

identifying, based on the communication pattern information, a connection topology from the fullmesh topology and the fattree topology corresponding to the selected first communication pattern; and assigning, based on the identified connection topology, nodes included in the parallel processing system that execute the application.

6. The storage medium according to claim 5, wherein the process further comprising:

selecting the first communication pattern which is the most similar to communication indicated by communication recording information at the time of first executing the application, based on the communication pattern information.

* * * * *